United States Patent
Nguyen (10) Patent No.: US 11,558,414 B1
(45) Date of Patent: Jan. 17, 2023

(54) AUTONOMOUS PENETRATION TESTER

(71) Applicant: Amazon Technologies, Inc., Seattle, WA (US)

(72) Inventor: Man Nguyen, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 261 days.

(21) Appl. No.: 17/090,345

(22) Filed: Nov. 5, 2020

(51) Int. Cl.
*H04L 9/40* (2022.01)
*G06N 20/00* (2019.01)
*H04L 43/045* (2022.01)
*H04L 43/50* (2022.01)

(52) U.S. Cl.
CPC ......... *H04L 63/1433* (2013.01); *G06N 20/00* (2019.01); *H04L 43/045* (2013.01); *H04L 43/50* (2013.01)

(58) Field of Classification Search
CPC ... H04L 63/1433; H04L 43/045; H04L 43/05; G06N 20/00
See application file for complete search history.

(56) References Cited

U.S. PATENT DOCUMENTS

| 2019/0149564 A1* | 5/2019 | McLean | H04L 63/1433 713/171 |
| 2020/0210590 A1* | 7/2020 | Doyle | G06N 20/00 |
| 2020/0285737 A1* | 9/2020 | Kraus | G06F 21/552 |
| 2020/0311630 A1* | 10/2020 | Risoldi | G06F 3/0482 |

* cited by examiner

*Primary Examiner* — Benjamin M Thieu
(74) *Attorney, Agent, or Firm* — Davis Wright Tremaine LLP (57) ABSTRACT

A method that includes obtaining threat model data associating at least one actor with an application. The at least one actor being capable of taking advantage of at least one potential vulnerability associated with the application. The method includes associating at least one technology with the at least one potential vulnerability based at least in part on the at least one actor, formulating a test based at least in part on the at least one technology, instructing a processor to perform the test on the application, and receiving results from the processor after performance of the test.

20 Claims, 6 Drawing Sheets

AUTONOMOUS PENETRATION TESTER

BACKGROUND

Penetration testing ("pentesting") is a testing process that identifies potential software and/or hardware vulnerabilities by performing tests on a computer system, web application, and/or web service. Pentesting is a systematic and safe cybersecurity technique that leverages tools, techniques, procedures, and processes in an attempt to compromise a system. Pentesting is generally performed by an organization against its own systems with the goal of finding security risks before an outside actor might find them. Thus, pentesting is typically performed before an application is released so the organization is not releasing unsafe applications.

Generally speaking, pentesting is performed by a human tester who is looking for an interface that the tester can use to circumvent security controls. In other words, pentesting is presently a largely manual process that can be both labor and time consuming. Many large Internet or online companies own thousands of public facing Internet Protocol ("IP") addresses, and operate thousands of public facing applications. Keeping customer and other data safe consumes significant effort and resources.

One reason pentesting requires so much time to conduct is that pentesting requires adaptable logic to perform. A tester may have a checklist of test procedures to perform and the results of one or more previous test procedures helps determine which subsequent test procedures are performed. Further, the knowledge and experience of the tester influences which subsequent test procedures the tester performs as well as the manner in which the tester performs the subsequent test procedures. Therefore, ensuring that testing is performed consistently is complex and resource intensive.

BRIEF DESCRIPTION OF THE DRAWINGS

Various techniques will be described with reference to the drawings, in which.

DETAILED DESCRIPTION

Unlike prior art manual pentesting methods, autonomous pentesting leverages threat models (e.g., threat model diagrams) and other preexisting internal and/or external data to automatically develop and execute test plans. In this description, the term "potential vulnerability" refers to a software security finding (e.g., a software bug). For example, a potential vulnerability may include a condition that allows accidental deletion of data by a user. The term "actor" refers to a person, thing, or entity that could take advantage of a potential vulnerability. For example, a person who accidentally uses the potential vulnerability to delete the data is an unintentional actor. However, actors also include intentionally bad actors and automated processes (e.g., robots, scripts, and the like) designed to purposefully take advantage of potential vulnerabilities. Actors include, for example, script genies, researchers, professional hackers, and the like. The term "target" refers to a public facing access point or endpoint. Examples of targets include an IP address, an interface component (e.g., a user input), an application programming interface ("API") endpoint, a Uniform Resource Identifier ("URI") endpoint, and the like. A target provides external or public access to applications, such as a web application executing on an internal computing device, an API, a web service executing on an internal computing device, an application executing on an external computing device (e.g., a mobile device), and the like.

By way of a non-limiting example, if a web application has a date input (e.g., a textbox) for receiving user input corresponding to a birthday, the date input should receive eight numeric characters that correspond to a valid date. The possibility that this date input might lack proper security controls and may accept other types of data, such as non-numeric characters or a string of computer code, is a potential vulnerability. This type of potential vulnerability is referred to as a cross site scripting ("XSS") vulnerability. In this example, the date input is the target. If the XSS vulnerability is not taken advantage of, no problems occur. On the other hand, if an actor (e.g., a person or robot on the Internet) takes advantage of the XSS vulnerability by entering non-numeric characters into the target (the date input), potential harm may occur. To prevent the bad actor from taking advantage of the XSS vulnerability, pentesting may be used to test the date input to see what types of data the date input will accept and how the application reacts to that data. If the pentesting discovers that the date input accepts a string of computer code, the application executes that computer code, and the execution of that computer code causes harm (e.g., the deletion of important information), knowledge of this discovery may be communicated to developers who may remediate the XSS vulnerability by adding one or more security controls to the date input and/or the application. In this manner, pentesting is used to identify actual vulnerabilities that may lead to inappropriate use, if taken advantage of by an actor.

Unlike prior art pentesting, which is performed manually, autonomous pentesting is performed by a computing system. Autonomous pentesting may begin with the computing system performing reconnaissance on a desired scope (e.g., a number of applications or an entire organization). During reconnaissance, the computing system identifies all of the potential targets within the desired scope. For example, the computing system may identify all of the potential targets accessible via the Internet within the desired scope. The computing system also examines internal information and collects any previously identified potential vulnerabilities for each application within the desired scope. Resulting reconnaissance data associates each potential vulnerability with at least one application and at least one target via which the potential vulnerability may be taken advantage of.

Next, the computing system performs threat modeling or otherwise obtains threat model data for each application within the desired scope. Threat modeling identifies any potential actors for each application within the desired scope. The threat model data associates each potential actor with one or more of the applications within the desired scope.

Application data includes both the reconnaissance data and the threat model data. The reconnaissance data and the threat model data may be combined to associate each potential vulnerability with at least one application, at least one target, and at least one actor that may take advantage of the potential vulnerability via the at least one target.

Then, the computing system may select a portion of the applications within the desired scope that have the greatest risk. For example, the computing system may assign a risk score to each application within the desired scope, rank the applications within the desired scope based on those risk scores, and select a predetermined number of the applications based on their assigned risk scores. This ensures that computing resources and/or testers are pentesting those of the applications that pose the greatest risk. For example, the computing system may select ten of the applications assigned greatest risk scores. A machine learning ("ML") technique, such as a decision tree, neural network ("NN"), and the like, may be used to assign the assign the risk scores to the applications.

The computing system enriches the application data obtained for the selected applications by mapping a test technology (e.g., a tool, a technique, or a procedure) to each potential vulnerability identified in the application data. Then, the computing system automatically generates a test plan that includes each test technology. The test plan includes a number of testing steps that each includes information necessary to perform a test, such an identification of the target to be tested. The computing system automatically generates jobs based on the test plan and forwards the jobs to one or more test engines that instruct one or more processors to perform the tests listed in the test plan. The processor(s) return the results of these tests the test engine(s). The test engine(s) forward the results to the computing system. At this point, the result may be made available to developers who can correct any of the potential vulnerabilities that are capable of causing harm.

Thus, autonomous pentesting may be characterized as converting a threat model diagram into a test plan and autonomously testing targets within the threat model diagram. This automation may help speed up pentesting as well as make it more consistent than prior art manual pentesting methods that rely on the knowledge and experience of a human tester to determine which procedures to perform.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

For ease of illustration, pentesting will be described as being performed by an entity on its own systems and applications, but this is not a requirement. Pentesting may instead be performed for the entity by a third party. The entity may have developed the application(s) being pentested or the application(s) may have been developed by a third party. The term "internal computing device" will be used to refer to a computing device operated, owned, and/or controlled by the entity. The term "external computing device" will be used to refer to a computing device operated, owned, and/or controlled by a third party.

Pentesting allows an entity that owns or controls an application to act as though the entity is trying to take advantage of any identified potential vulnerabilities. Unfortunately, as mentioned above, pentesting is presently a largely manual process that can be both labor and time consuming. Therefore, it is desirable to speed up pentesting.

Because applications should not be released until they have been properly pentested, prior art manual pentesting methods make it difficult to release applications timely. Further, because applications change over time, they may require multiple rounds of pentesting. Thus, using prior art manual pentesting methods, some applications could potentially be required to undergo perpetual pentesting because no sooner would pentesting a version of the application be completed than a next version of the application would have to undergo a new round of pentesting.

The term "external surface" refers to all of the targets within a particular scope through which an external actor may attempt to take advantage of a potential vulnerability. The scope may include an application, a subcomponent of an application, an API, a service, an organization, a mobile device, a computing system, and the like. An IP address, for example, can host multiple applications and therefore can present a large external surface. Many companies own and operate hundreds or thousands of IP address that host multiple applications each. Such companies may own and operate hundreds or thousands of publicly facing domain names. In other words, many companies have large external surfaces that would require a long time to properly pentest using prior art manual pentesting methods.

Figure 1:
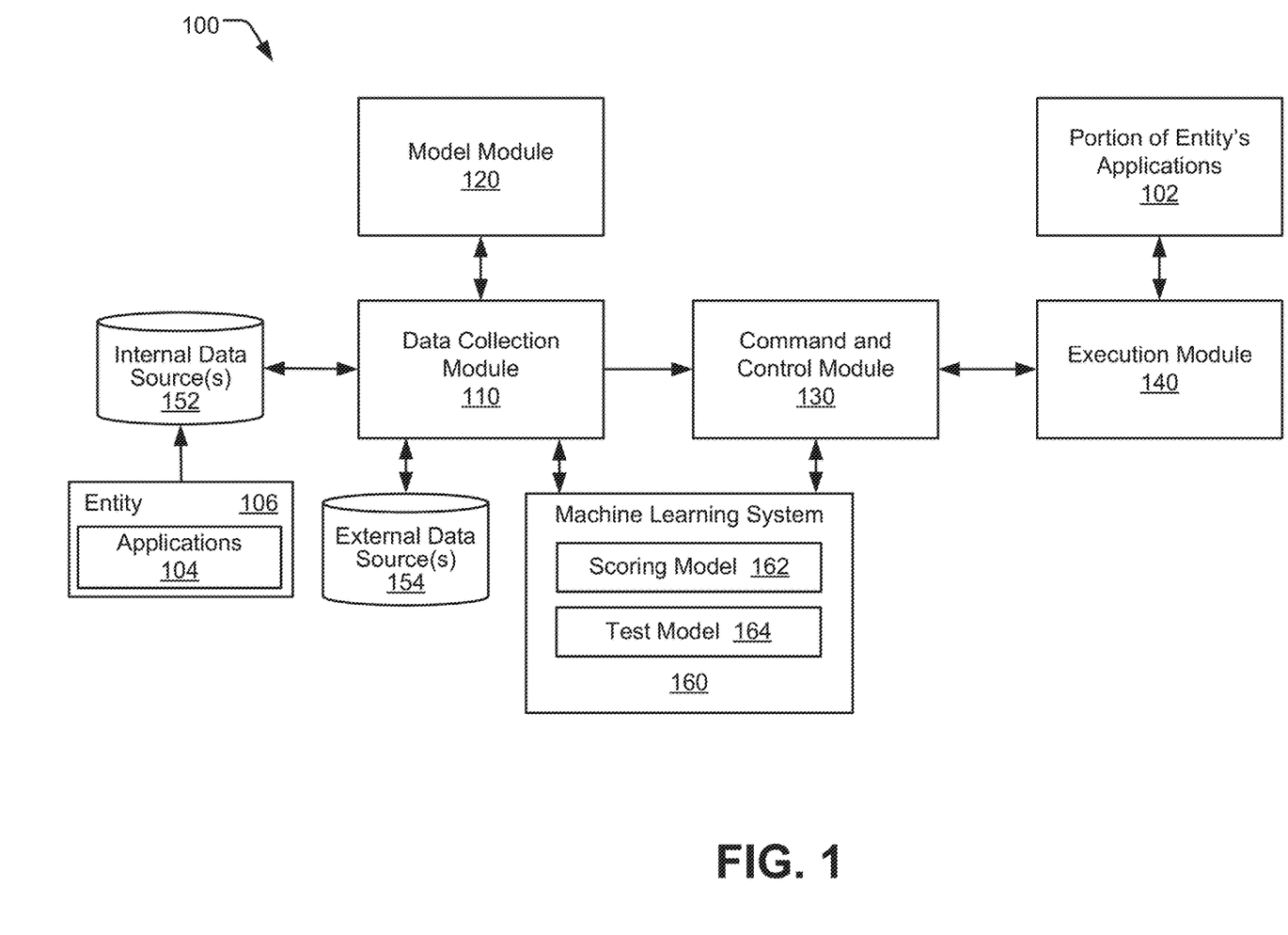
FIG. 1 is a block diagram illustrating components of a system configured to perform autonomous penetration testing.
Figure 4:
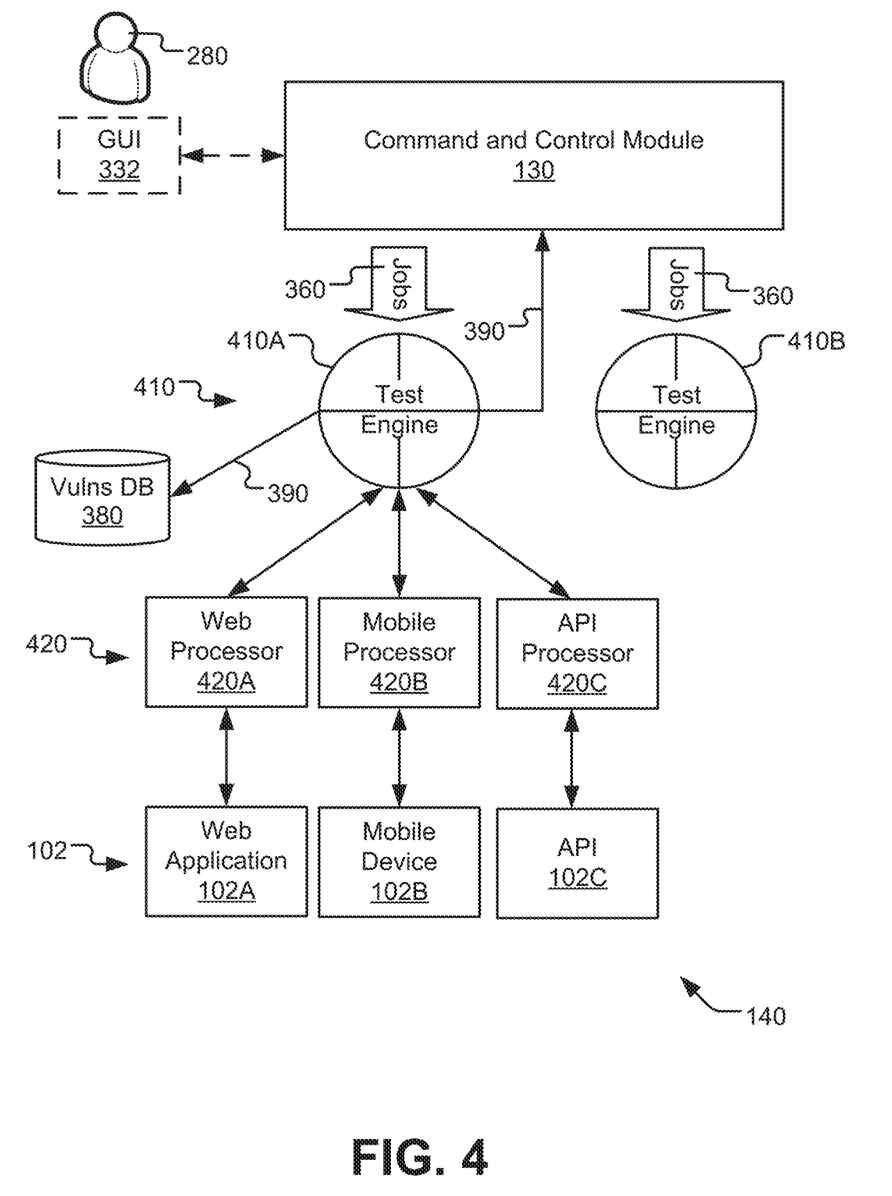
FIG. 4 is a block diagram illustrating components of an execution module of the system of FIG. 1.

FIG. 1 is a block diagram illustrating components of a system 100 configured to perform autonomous penetration testing on a portion 102 of applications 104 operated, owned, and/or controlled by an entity 106. Referring to FIG. 4, in the embodiment illustrated, the portion 102 includes a web application 102A executing on an internal computing device (e.g., a web server 606 illustrated in FIG. 6), a mobile application 102B executing on a mobile device (which is an external computing device, such as an electronic client device 602 illustrated in FIG. 6), an API 102C (e.g., implementing a web service) executing on an internal computing device (e.g., at least one application server 608 illustrated in FIG. 6), and the like. However, the portion 102 may include any application configured to execute on either an internal or external computing device that includes at least one target that is accessible by the system 100. Portions of the system 100 may be implemented by one or more internal computing devices, such as the application server(s) 608 illustrated in FIG. 6 and described below. Referring to FIG. 1, the system 100 may be operated by the entity 106, but, as mentioned above, this is not a requirement.

The system 100 is configured to automatically generate one or more test plans and automatically execute the test plan(s) against the portion 102 of the applications 104 to automatically identify actual security risks and, at the same time, eliminate falsely identified potential vulnerabilities. Thus, the system 100 may reduce an amount of time required to formulate and execute pentests. In the embodiment illustrated, the system 100 includes a data collection module 110, a model module 120, a command and control module 130, and an execution module 140. The data collection module 110 is configured to collect data from the model module 120, one or more internal data sources 152, one or more third party or external data sources 154, and a machine learning system 160. The internal data source(s) 152 store(s) information about the entity's applications 104. The machine learning system 160 is configured to execute a scoring model 162 that generates risk scores for the entity's applications 104. Both the scoring model 162 and a test model 164 may be executed inside the machine learning system 160, which forwards their output to the data collection module 110 and the command and control module 130, respectively. The data collection module 110 may use the risk scores to select the portion 102 of the entity's applications 104. The command and control module 130 is configured to use the data collected by the data collection module 110 and the test model 164 executed by the machine learning system 160 generate the test plan(s). The execution module 140 is configured to execute the test plan(s) on the portion 102 of the entity's applications 104.

Figure 2:
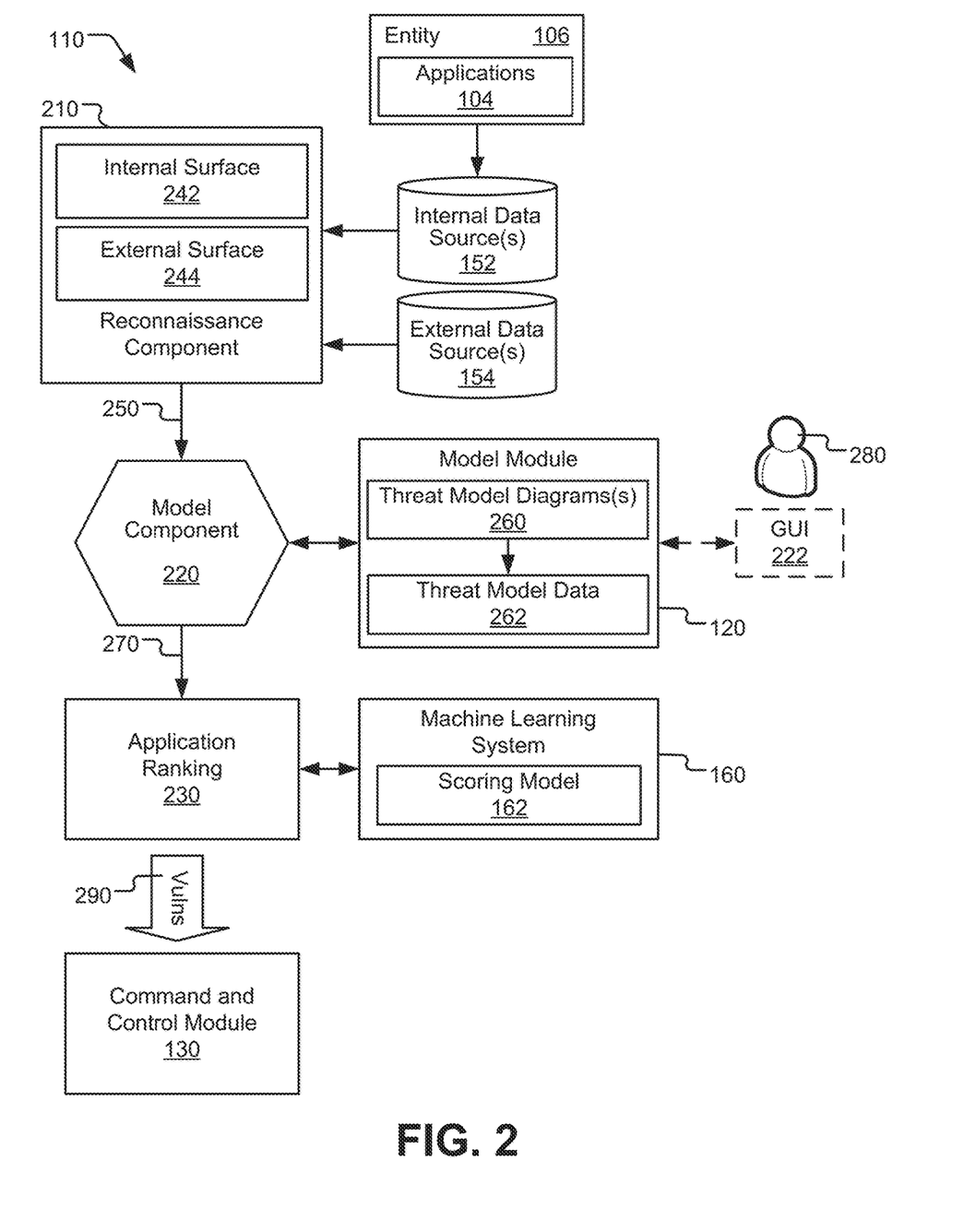
FIG. 2 is a block diagram illustrating components of a data collection module of the system of FIG. 1.

FIG. 2 is a block diagram illustrating components of the data collection module 110. In the embodiment illustrated, the data collection module 110 includes a reconnaissance component 210, a model component 220, an optional graphical user interface ("GUI") 222, and an application ranking component 230. Reconnaissance is a process of exploring, discovering, and collating security data. The reconnaissance component 210 performs reconnaissance on a desired scope (e.g., all applications and computing systems owned, operated, and/or controlled by the entity 106) to map a relevant external surface 244. The relevant external surface 244 identifies the potential targets within the desired scope that are publically accessible (e.g., via a network, such as the Internet) and associates each of the potential targets with at least one of the applications 104. Optionally, the relevant external surface 244 may associate each of the potential targets with a technology component or subcomponent of the application with which the potential vulnerability is associated.

The reconnaissance component 210 may use public information obtained from public sources to map the relevant external surface 244. For example, the reconnaissance component 210 may use or query the external data source(s) 154 to identify targets owned, operated, and/or controlled by the entity 106. The external data source(s) 154 may include business information sources that the reconnaissance component 210 may use to determine the scope of the entity 106. For example, the reconnaissance component 210 may query the external data source(s) 154 to identify entities associated with the entity 106 and business transactions (e.g., acquisitions, mergers, and the like) that affect the scope of the entity 106 (e.g., company). By way of non-limiting examples, the external data source(s) 154 may include Open Source Intelligence ("OSINT"), Shodan (available at www.shodan.io), Dun and Bradstreet (operating a website at www.dnb.com), and the like. Thus, the reconnaissance component 210 may map the relevant external surface 244 by querying open source or publicly available information.

The reconnaissance component 210 also performs reconnaissance on any applications (e.g., the applications 104) executing within the desired scope to map a relevant internal surface 242. The relevant internal surface 242 identifies any potential vulnerabilities of the applications 104 executing within the desired scope and associates each of the potential vulnerabilities with at least one of the applications 104. Optionally, the relevant internal surface 242 may associate each of the potential vulnerabilities with a technology component (e.g., a target) or subcomponent of the application with which the potential vulnerability is associated.

To obtain the relevant internal surface 242, the reconnaissance component 210 may use information obtained from the internal data source(s) 152, such as an internal database that stores potential vulnerabilities associated with each of the applications 104, or technology component or subcomponent of each application. For example, the internal data source(s) 152 may store a ledger in which new applications are registered and that tracks the lifecycle of each of application developed by or for the entity 106. The internal data source(s) 152 may indicate which development and/or testing phases a particular application has completed, such as code review, pentesting, threat modeling, and the like. Additionally, the internal data source(s) 152 may identify any potential vulnerabilities identified at each phase. The internal data source(s) 152 may also identify features of the application as well as any security controls present. During reconnaissance, the reconnaissance component 210 examines internal information obtained from the internal data source(s) 152, collects any potential vulnerabilities that were previously identified for each of the applications 104, and aggregates this information into the relevant internal surface 242.

Together, the relevant internal and external surfaces 242 and 244 will be referred to as vulnerability data 250. As mentioned above, the relevant external surface 244 associates potential targets with the applications 104 (or technology components or subcomponents of the applications 104). As also mentioned above, the relevant internal surface 242 associates each of the potential vulnerabilities with at least one of the applications 104 (or a technology component or subcomponent of the application(s)). Thus, the vulnerability data 250 associates each of the potential vulnerabilities with both one of the applications 104 and one or more targets. The vulnerability data 250 may also associate each of the potential vulnerabilities with a test technology component or subcomponent of the application(s) associated with the potential vulnerability. The model component 220 and/or the application ranking component 230 has/have access the vulnerability data 250. For example, the reconnaissance component 210 may transmit the vulnerability data 250 to the model component 220 and/or the application ranking component 230.

The model module 120 implements one or more threat model diagrams 260 that include a different threat model diagram created for each of the applications 104. The model component 220 instructs the model module 120 to use the threat model diagram(s) 260 to generate threat model data 262 for each of the applications 104. Each of the threat model diagram(s) 260 may have been created manually by a user (e.g., the user 280) or automatically by the model module 120. The model module 120 may create the threat model diagram(s) 260 by performing threat modeling, which is also referred to as security architectural review. During threat modeling, the model module 120 examines an application's architecture and identifies potential vulnerabilities that could potentially be taken advantage of by an actor (e.g., a bad actor). By way of non-limiting examples, the model module 120 might determine whether an application will permit an actor to bypass authentication, examine (or sniff) data traffic, cause an unauthorized disclosure of information, and the like. The reconnaissance component 210 may be characterized as identifying both what the bad guys see and what is known about an application, and the model module 120 may be characterized as identifying what can go wrong with the application.

At least some technology components of an application and/or their functions are known to be potentially vulnerable to a specific set of actors. For example, user input fields can be used to perform injection type challenges if sufficient security measures are not in place. The threat model data 262 identifies one or more potential actors each mapped to at least one technology component or subcomponent within the applications 104). As mentioned above, the vulnerability data 250 associates each of the potential vulnerabilities with both one of the applications 104 and one or more targets. Together, the vulnerability data 250 and the threat model data 262 will be referred to as application data 270. The application data 270 associates each of the potential vulnerabilities with one of the applications 104, one or more of the actors, and one or more of the targets. Optionally, the application data 270 may associate each of the potential vulnerabilities with a technology component or subcomponent of the application with which the potential vulnerability is associated. The application ranking component 230 has access to the application data 270. Optionally, the model component 220 transmits the application data 270 to the application ranking component 230.

Optionally, before the model component 220 instructs the model module 120 to generate the threat model data 262, the optional GUI 222 may be configured to allow a user 280 to select the threat model diagram(s) for which the model component 220 generates the threat model data 262 or to select the threat model data previously generated by the selected threat model diagram(s) for inclusion in the application data 270.

The model component 220 and/or the model module 120 may be implemented at least in part by a Dynamic Application Security Testing ("DAST") tool or similar vulnerability identification tool. A DAST tool is configured to communicate with the web application 102A (see FIG. 4) through a web front-end and identify potential actors and/or potential security vulnerabilities.

The reconnaissance component 210 and/or the model component 220 may be configured to help identify areas of exposure, such as technology components, targets, and/or applications, allowing focused remediation efforts to be performed. For example, the system 100 may remediate and/or identify for remediation any design vulnerabilities identified by the reconnaissance component 210 and/or the model component 220. Optionally, the system 100 may verify and/or enforce any remediation measures made.

Prior art pentesting methods do not use the threat model data 262, which is part of a security certification process. Instead, the threat model data 262 remains in its own repository and is not passed on for use by subsequent processes. In other words, the threat model data 262 is archived when the certification process is completed. In contrast, the system 100 (see FIG. 1) leverages the threat model data 262 to improve pentesting.

Because it may not be desirable to pentest all of the applications 104 and/or it may be desirable to pentest some applications ahead of other applications, the application ranking component 230 is configured to identify the portion 102 of the applications 104 that are riskiest and/or are in more urgent need of pentesting. The application ranking component 230 may be characterized as prioritizing those areas of the relevant internal and external surfaces 242 and 244 that are most risky. The application ranking component 230 assigns a risk score to each of the applications 104, ranks the applications 104 based on those risk scores, and selects a predetermined portion of the applications 104 based on their risk scores. For example, the application ranking component 230 may stack rank the applications 104 and select the ten highest ranked or riskiest applications.

The application ranking component 230 may use the scoring model 162 to determine the risk scores. The scoring model 162 may be implemented as a ML model, such as a decision tree, NN, and the like. The scoring model 162 may use values of criteria obtained for each of the applications 104 (e.g., from the internal data source(s) 152) and assign a risk score to the application based on the application's values of the criteria. By way of non-limiting examples, the criteria may include one or more of the following:

1. monetary value of transactions performed by the application within a predetermined time period (e.g., one million dollars per day);
2. number of actors identified by the threat model diagram(s);
3. number of bugs found by a code review;
4. number of potential vulnerabilities found by dynamic scanning or dynamic application analysis;
5. identification of security controls applied to the application;
6. type(s) of data (e.g., medical data, critical data, secure data, public data, and the like) handled by the application;
7. indication whether the application uses encryption for data transport;
8. indication whether the application uses authentication;
9. number of transactions, function calls, transaction value; and
10. classified (e.g., personal identifiable information) data at rest, processed, and/or transmitted The scoring model 162 may assign risk scores to the technology components (e.g., targets) or subcomponents of the applications 104. For each of the applications 104, the risk scores assigned to the technology components or subcomponents of the application may be combined to produce the risk score assigned to the application. Optionally, the risk scores assigned to the technology components or subcomponents may be used to stack rank the technology components or subcomponents. The scoring model 162 may identify vulnerabilities for each component, map each vulnerability to at least one technique, tactic, and/or procedure ("TTP"), and rate each vulnerability on a degree of complexity required to successfully execute the TTP.

The scoring model 162 may be implemented as a decision tree based on a manual process of collecting application criteria values and scoring applications based on those values. For example, the scoring model 162 may be trained using training data obtained by selecting a training set of applications and, for each application in the training set, asking developer(s) for the values of the criteria and/or obtaining the values from the internal data source(s) 152. Then, risk scores may be assigned manually to each application in the training set. The manually assigned risk scores and values of the criteria may be used to perform supervised training of the scoring model 162.

The scoring model 162 is implemented inside the machine learning system 160, which may be implemented in a cloud computing environment, such as Amazon Web Services ("AWS"). For example, the machine learning system 160 may implemented by Amazon SageMaker.

The application ranking component 230 may be used to review the applications identified in the internal data source(s) 152 and identify one or more of these applications that should undergo pentesting.

After selecting the portion 102 of the applications 104, the application ranking component 230 communicates this section to the command and control module 130. For example, the application ranking component 230 may communicate a list that identifies the portion 102 to the command and control module 130. When this occurs, the command and control module 130 may access the application data 270. Alternatively, the application ranking component 230 may create and store a portion 290 of the application data 270 that is associated with the selected portion 102 of the applications 104. The application ranking component 230 may forward the portion 290 or information (e.g., a link, a reference, and the like) necessary to access the portion 290 to the command and control module 130. The portion 290 includes a portion of the vulnerability data 250 associated with the selected portion 102 of the applications 104 and a portion of the threat model data 262 associated with the selected portion 102 of the applications 104. The portion 290 identifies those potential vulnerabilities in the application data 270 that are associated with the portion 102 of the applications 104. Thus, the application ranking component 230 may be characterized as having selected those potential vulnerabilities.

Figure 3:
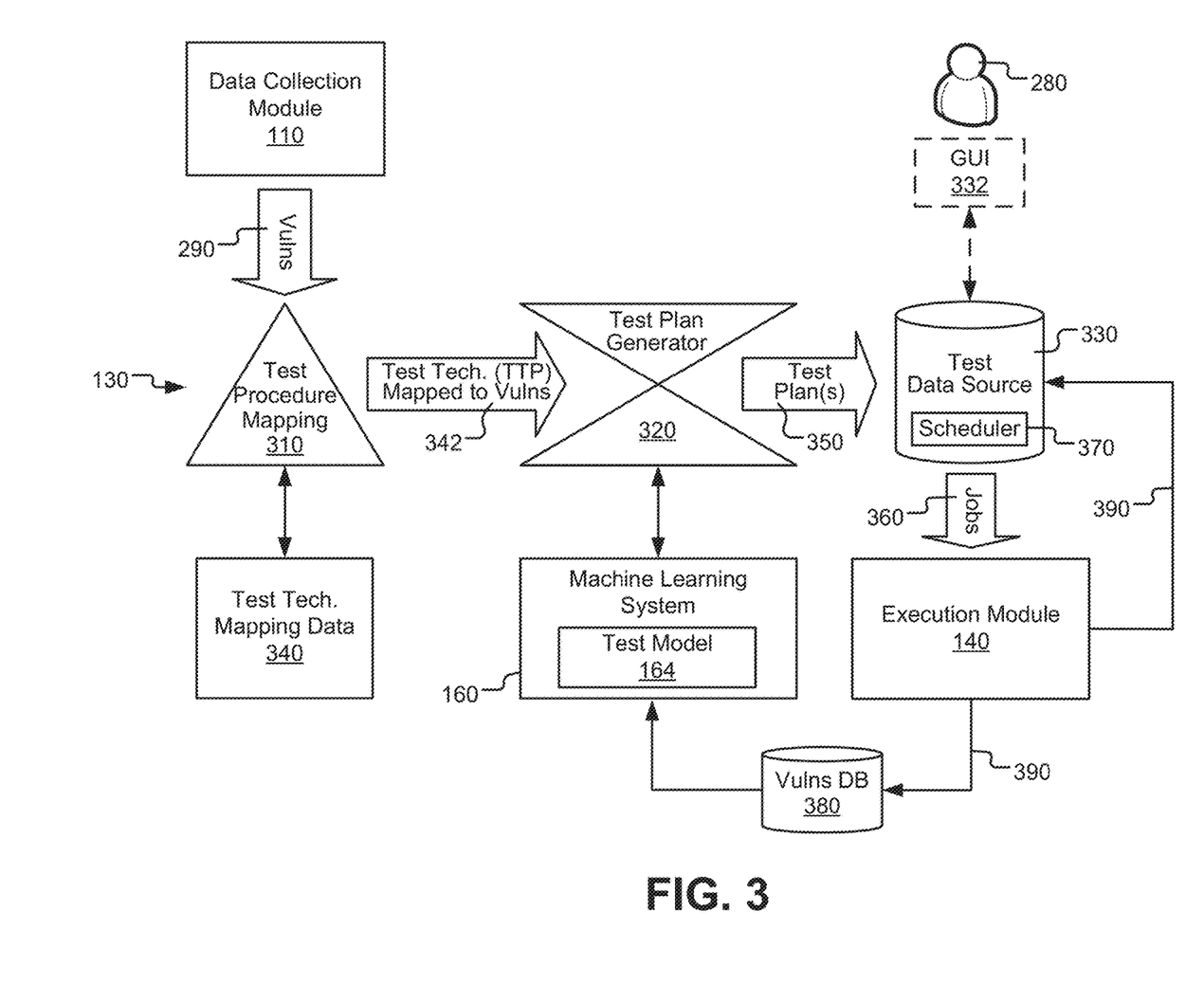
FIG. 3 is a block diagram illustrating components of a command and control module of the system of FIG. 1.

FIG. 3 is a block diagram illustrating components of the command and control module 130. The command and control module 130 may be implemented in a cloud computing environment, such as AWS. In the embodiment illustrated, the command and control module 130 includes a test procedure mapping component 310, a test plan generator 320, a test data source 330, and an optional GUI 332.

The test procedure mapping component 310 has access to the application data 270 and/or the portion 290 of the application data 270. The test procedure mapping component 310 maps each potential vulnerability associated with the portion 102 of the applications 104 to a test technology configured to test the potential vulnerability. By way of non-limiting examples, the test technology may include at least one TTP. Specific test technologies are associated with particular potential actors (e.g., bad actors). The test procedure mapping component 310 stores or has access to data 340 that associates one or more test technologies with known pairings of preexisting actors and preexisting vulnerabilities. The data 340 may include Common Weakness Exposure ("CWE") information. Currently available threat model diagrams do not provide CWE information, which may be obtained from an organization (e.g., The MITRE Corporation). CWE information includes a list of common types of software and/or hardware vulnerabilities that may potentially have security ramifications. Referring to FIG. 2, the model component 220 and/or the model module 120 may curate the threat model report (e.g., the threat model data 262) to include the CWE information, which is mapped to each actor identified (e.g., in the threat model data 262) and provides a systematic way to determine which TTPs will best match each vulnerability identified in the CWE information. In other words, the test procedure mapping component 310 may match each vulnerability identified in the CWE information with one or more TTP. Because the test procedure mapping component 310 has access to the threat model data 262 or a relevant portion thereof, the test procedure mapping component 310 is able to identify one or more potential actors associated with each potential vulnerability, use the data 340 to identify the specific test technology associated with each pair of potential vulnerability and its associated potential actor, and map the identified test technology to the potential vulnerability. For example, the test procedure mapping component 310 may look up each potential vulnerability and its associated potential actor in the data 340 to identify an associated test technology used by the potential actor to potentially take advantage of vulnerabilities of the same type as the potential vulnerability.

The test procedure mapping component 310 generates technology mapped data 342 that includes the test technologies (e.g., in a list) that may be used to conduct tests on the portion 102 of the applications 104. Each test technology in the technology mapped data 342 is mapped to at least one potential vulnerability that is associated with at least one application in the portion 102 of the applications 104, one or more of the actors, and one or more of the targets. Further, each of the potential vulnerabilities may have been associated previously with a technology component or subcomponent of the application(s) with which the potential vulnerability is associated. The test plan generator 320 has access to the technology mapped data 342. For example, the test procedure mapping component 310 may transmit the technology mapped data 342 to the test plan generator 320.

The test plan generator 320 obtains the technology mapped data 342 as input and generates one or more test plans 350 based at least in part on the technology mapped data 342 and the test model 164. The test model 164 may be characterized as transcribing the test technologies identified in the technology mapped data 342 into the test plan(s) 350. The test model 164 is configured to match each test technology (e.g., each TTP) in the technology mapped data 342 with implementation details that are likely to yield a successful test (e.g., the detection of a potential vulnerability that can be taken advantage of by the test technology).

The test model 164 may be configured to construct the test plan(s) 350 to test a predefined set of vulnerability types. By way of non-limiting examples, the predefined set of vulnerability types may include vulnerabilities identified by the Open Web Application Security Project ("OWASP"), such as its top ten vulnerabilities, which currently include the following ten vulnerabilities:

1. Injection
2. Broken Authentication
3. Sensitive Data Exposure
4. Extensible Markup Language ("XML") External Entities ("XXE")
5. Broken Access control
6. Security misconfigurations
7. Cross Site Scripting ("XSS")
8. Insecure Deserialization
9. Using Components with known vulnerabilities
10. Insufficient logging and monitoring Each of the test plan(s) 350 includes a number of operations, referred to as testing steps. The test model 164 and/or test plan generator 320 is/are configured to chain the testing steps together in a manner that increases the likelihood of successfully identifying an actual vulnerability. In other words, the test model 164 and/or test plan generator 320 determine an order in which the testing steps are performed. For example, a particular one of the test plan(s) 350 may test a potential XSS vulnerability by providing (e.g., using a tool or a script) test input that is based on initial parameters included in the test plan to an input field. Then, the test plan may cause the execution module 140 to examine how the application responds to the test (e.g., by apply a regular expression ("regex") filter and/or using another analysis technique) to determine whether the potential XSS vulnerability can be taken advantage of and, therefore, is an actual vulnerability. A potential vulnerability is determined to be an actual vulnerability when the test elicits a specific response indicative of the presence of a particular vulnerability (e.g., a XSS vulnerability). The test plan may include additional chained testing steps that perform additional testing (e.g., to determine the severity of the actual vulnerability) when an actual vulnerability is identified. In this manner, the test plan eliminates false positives or potential vulnerabilities that are not actual vulnerabilities.

The test plan generator 320 and/or the test model 164 assemble(s) the testing steps (e.g., processes and parameters) necessary to execute one or more specific test on a particular target to test for a specific condition (e.g., the presence of a particular vulnerability). As mentioned above, the test plan(s) 350 may list the testing steps in a specific order so that the test will generate desired results.

Each of the test plan(s) 350 includes any information (e.g., parameter values) and testing steps that are necessary for a potential actor to take advantage of a potential vulnerability and potentially cause harm. The test plan(s) 350 may be configured to be scalable. The test plan(s) 350 may be configured to test portions of the relevant external surface 244 (see FIG. 2) by testing easily taken advantage of potential vulnerabilities, recurring or common vulnerabilities, and the like.

As mentioned above, the test model 164 is implemented inside the machine learning system 160. The test model 164 (which may include a sequence of test executions) may be implemented as a ML model (e.g., a decision tree, NN, and the like) created using data collected from a manual pentesting process as training data. The training data may be obtained from a vulnerabilities database 380 that stores results obtained from performing tests on targets. The results obtained from the test model 164 include the TTPs and a required sequence in which the TTPs need to be executed to identify any actual vulnerabilities that may be present.

The test model 164 may be configured to perform the functionality of the test procedure mapping component 310. In such embodiments, the test procedure mapping component 310 is omitted, the test model 164 maps each potential vulnerability to a test technology, and the test plan generator 320 generates the test plan(s) 350.

The test data source 330 has access to the test plan(s) 350. For example, the test plan generator 320 may transmit the test plan(s) 350 to the test data source 330. The test data source 330 obtains the test plan(s) 350 as input, stores the test plan(s) 350, generates job(s) 360 based on the test plan(s) 350, and transmits the job(s) 360 to the execution module 140 for execution thereby. Each of the job(s) 360 includes at least a portion of the testing steps of one of the test plan(s) 350 and an execute time value specifying when the portion of the testing steps is to be executed by the execution module 140. The test data source 330 implements or is used in conjunction with a scheduler 370 that may schedule the execution of the test plan(s) 350 by the execution module 140. Thus, the scheduler 370 may provide the execute time value to each of the job(s) 360.

The scheduler 370 may be configured to automatically schedule execution of the test plan(s) 350 after the test plan(s) 350 have been generated without any additional input from the user 280. Additionally or alternatively, the optional GUI 332 may be configured to allow the user 280 to manually schedule the execution one or more of the test plan(s) 350.

The test data source 330 (see FIG. 3) and/or the scheduler 370 (see FIG. 3) is/are configured to schedule execution of the job(s) 360 (e.g., using the execution time value) in a manner that emulates a user to help prevent the test from disabling the application and/or computing system being tested. In other words, the system 100 (see FIG. 1) may implement autonomous pentesting in a manner that emulates manual pentesting conducted by human testers. In this manner, the system 100 will not launch a denial of service ("DoS") attack, which typically relies on simultaneously making a large number of connections and/or simultaneously sending a large number of communications to a computing system. Additionally, to help ensure that the pentesting is conducted safely, the system 100 may conduct the pentesting before the portion 102 of the application 104 are in production.

The test data source 330 may receive results 390 obtained in response to the executed tests from the execution module 140 and may store these results 390. The test data source 330 may be implemented as a database but this is not a requirement. The execution module 140 and/or the test data source 330 may transmit the results 390 obtained in response to the executed tests to the vulnerabilities database 380 for storage thereby. The optional GUI 332 may be configured to run queries and/or reports against the test data source 330 and/or the vulnerabilities database 380 and display the results of the queries and/or reports to the user 280.

FIG. 4 is a block diagram illustrating components of the execution module 140. In the embodiment illustrated, the execution module 140 includes one or more test engines 410, and one or more processors 420. In FIG. 4, the test engine(s) 410 have been illustrated as including test engines 410A and 410B but, the test engine(s) 410 may include any number of test engines, which allows the execution module 140 to be scaled up and scaled down as necessary.

The test data source 330 (see FIG. 3), the scheduler 370 (see FIG. 3), and/or the user 280 (via the optional GUI 332) assign(s) each of the job(s) 360 to at least one of the test engine(s) 410. The test data source 330 transmits each of the job(s) 360 to the test engine to which the job was assigned. Each of the job(s) 360 is addressed to one of the test engine(s) 410 to which the job was assigned and includes the execute time value and at least a portion of the testing steps of one of the test plan(s) 350 (see FIG. 3). The execute time value included in each of the job(s) 360 specifies when the portion of the testing steps identified by the job is to be executed by the test engine to which the job was assigned.

The test engine(s) 410 generates instructions to the processor(s) 420 based on the job(s) 360, which were created by the test data source 330 (see FIG. 3) based on the test plan(s) 350 (see FIG. 3). The testing steps in each of the test plan(s) 350 may be configured for execution by one of the processor(s) 420. In such embodiments, the test data source 330 may generate a single job based on a single test plan. In alternate embodiments including multiple processors, the test plan(s) 350 may include testing steps configured for execution by two or more of the processor(s) 420. In such embodiments, the test data source 330 may generate a different job for each of the multiple processors based on a single test plan. Further, the test engine(s) 410 may divide a single job into instructions that the test engine(s) 410 sends to two or more of the processor(s) 420 for execution thereby.

Each of the test engine(s) 410 is configured to authenticate with the test data source 330 (see FIG. 3), obtain (e.g., pull) any of the job(s) 360 assigned to the test engine, store in a queue any jobs not yet completed, transmit instructions to execute each of jobs in the queue to one of the processor(s) 420, receive results obtained by the processor after the job has been performed, and forward the results 390 to the test data source 330 and/or the vulnerabilities database 380 (see FIG. 3) for storage thereby. As mentioned above, each of the job(s) 360 includes at least a portion of the testing steps of one of the test plan(s) 350 and the execute time value at which the portion of the testing steps are to be executed by the test engine to which the job was assigned. The instructions sent to the processor(s) 420 instruct the processor(s) to perform the testing steps in one of the jobs at the appropriate time as indicated by the execute time value of the job.

The test data source 330 (see FIG. 3) may receive the results 390 obtained in response to the executed tests from the test engine(s) 410. The test engine(s) 410 and/or the test data source 330 may transmit the results 390 to the vulnerabilities database 380 for storage thereby. Referring to FIG. 3, the machine learning system 160 may use the results 390 stored in the vulnerabilities database 380 to update the test model 164. The vulnerabilities database 380 may store the testing steps performed to take advantage of a potential vulnerability, the impact of the testing steps, and the severity of the potential vulnerability when the potential vulnerability is determined to be an actual vulnerability.

Different types of targets require different processors. Referring to FIG. 4, the processor(s) 420 is/are configured to interface with the targets (e.g., a socket using a communication protocol and port) and test at least one application in the portion 102 of the applications 104. In other words, the processor(s) 420 are configured to translate the instructions received from the test engine(s) 410 into commands that the portion 102 of the applications 104 understands and can execute. In the embodiment illustrated, the processor(s) 420 include a web processor 420A, a mobile processor 420B, and an API processor 420C configured to translate testing steps into commands for the web application 102A, the mobile application 102B, and the API 102C, respectively. For example, the API 102C may implement methods or operations, such as create, read, update, and delete. Therefore, the API processor 420C may be configured to interface with these methods or operations. Similarly, an IP address may communicate via Transmission Control Protocol ("TCP") or User Datagram Protocol ("UDP") and on different ports. Therefore, the web processor 420A must be configured to provide instructions using an appropriate protocol and over the correct port. Each of the processor(s) 420 may be implemented as at least one script, at least one tool, and/or at least one technique. The processor(s) 420 may be characterized as being tools configured to launch a test based on the instructions received from the test engine(s) 410.

By way of a non-limiting example, one of the test engine(s) 410 may instruct the web processor 420A to enter a predetermined character string into a user input (e.g., a text box) of the web application 102A and return the result of this action. The test engine may repeat this instruction a number of times for different character strings. If the web application 102A reacts appropriately (e.g., the back end system or business logic filters the character strings) the potential vulnerability is determined to be a false positive. On the other hand, if the web application 102A reacts inappropriately, the potential vulnerability is determined to be an actual vulnerability.

The instructions sent to the web processor 420A may include HTTP methods, such as POST, GET, PUT, PATCH, DELETE, HEAD, TRACE, and CONNECT. For example, the GET and/or POST methods may be used to execute portions of a test plan against the web application 102A and collect the results from the web processor 420A. The web processor 420A sends the results to the test engine that was assigned the job. The test engine saves the results in the test data source 330 (see FIG. 3) and/or the vulnerabilities database 380 (see FIG. 3). Users (e.g., the user 280) may view the results by querying the test data source 330 and/or the vulnerabilities database 380 or running reports against the test data source 330 and/or the vulnerabilities database 380. The optional GUI 332 may be configured to run such queries and/or reports and present the results to the user 280. The optional GUI 332 may display recommendations for remediating any actual vulnerabilities identified. The recommendations may be based on the type of vulnerability identified. The users may remedy any actual vulnerabilities identified.

The execution module 140 may be characterized as being a distributed module and may be configured to include any number of test engine(s) 410 and/or any number of processor(s) 420, which allows the system 100 (see FIG. 1) to be scaled up and scaled down as necessary. The processors 420A-420C may be implemented in different locations, and may be implemented near the targets, which in the embodiment illustrated are components of the web application 102A, the mobile application 102B, and the API 102C, respectively. By locating the processors 420A-420C near their targets, transmission distance (and time) may be reduced between the processors 420A-420C and the web application 102A, the mobile application 102B, and the API 102C, respectively.

Referring to FIG. 1, the system 100 may be characterized as associating actors identified in the threat model data 262 (obtained from threat model diagram(s) 260) with potential vulnerabilities, mapping the potential vulnerabilities associated with the portion 102 of the applications 104 to test technologies, and converting the test technologies into the test plan(s) 350 that test targets associated with the portion 102 of the applications 104.

The system 100 may be configured to identify zero-day vulnerabilities, which are vulnerabilities that are not known to exist by the entity 106. Therefore, the entity 106 does not yet have a fix for any zero-day vulnerabilities discovered. By way of a non-limiting example, the system 100 may be configured to perform unusual or non-standard (or off-the-wall) tests of an application to see how the applications responds. In this manner, the system 100 may discover one or more zero-day vulnerabilities. The system 100 may learn from zero-day vulnerabilities discovered against other applications and use the same techniques that triggered those zero-day vulnerabilities against other applications. For example, the system 100 may be configured to discover vulnerabilities beyond the top ten vulnerabilities identified by OWASP and listed above.

As described above, the system 100 may be configured to identify actual vulnerabilities operating on layer seven (which is the application layer) of the Open Systems Interconnection ("OSI") model. The system 100 may be configured to identify actual vulnerabilities operating on other layers, such as the layer three (which is the network layer), of the OSI model. For example, the system 100 may be configured to test layer three and/or other layers when looking for zero-day vulnerabilities.

A chained test is a test that takes advantage of multiple potential vulnerabilities, including potential vulnerabilities that are deeper in a computing system. For example, with some types of tests, it may be possible to get from the front end through the business layer to the data layer from which data may be extracted. Doing so requires that the actor find a vulnerability in the front end, chain multiple vulnerabilities to move through the business layer and extract data from the data layer. Currently available systems (e.g., DAST) are capable of testing the surface layer but they do not chain tests to also test deeper system layers. The system 100 is configured to chain the testing steps. Therefore, depending on the details of a particular test plan, the order of the testing steps in the test plan may be important. For example, at each step in the chain, the system 100 may use data ascertained from a previous step in the test plan as input into any cascading or downstream steps in the test plan. Further, the system 100 may be configured to create a test plan that includes multiple chained tests (referred to as a poly-chain test) for a single potential vulnerability.

Before creation of the system 100, test plans were created manually by examining an application's characteristics. Then, the test plan was iterated through by a human tester. In contrast and as described above, the system 100 (see FIG.

1) is configured to automatically create and implement the test plan(s) 350 (see FIG. 3), which chain multiple tests together. In this manner, the system 100 may conduct pentesting in a more consistent manner than manual pentesting.

Figure 5:
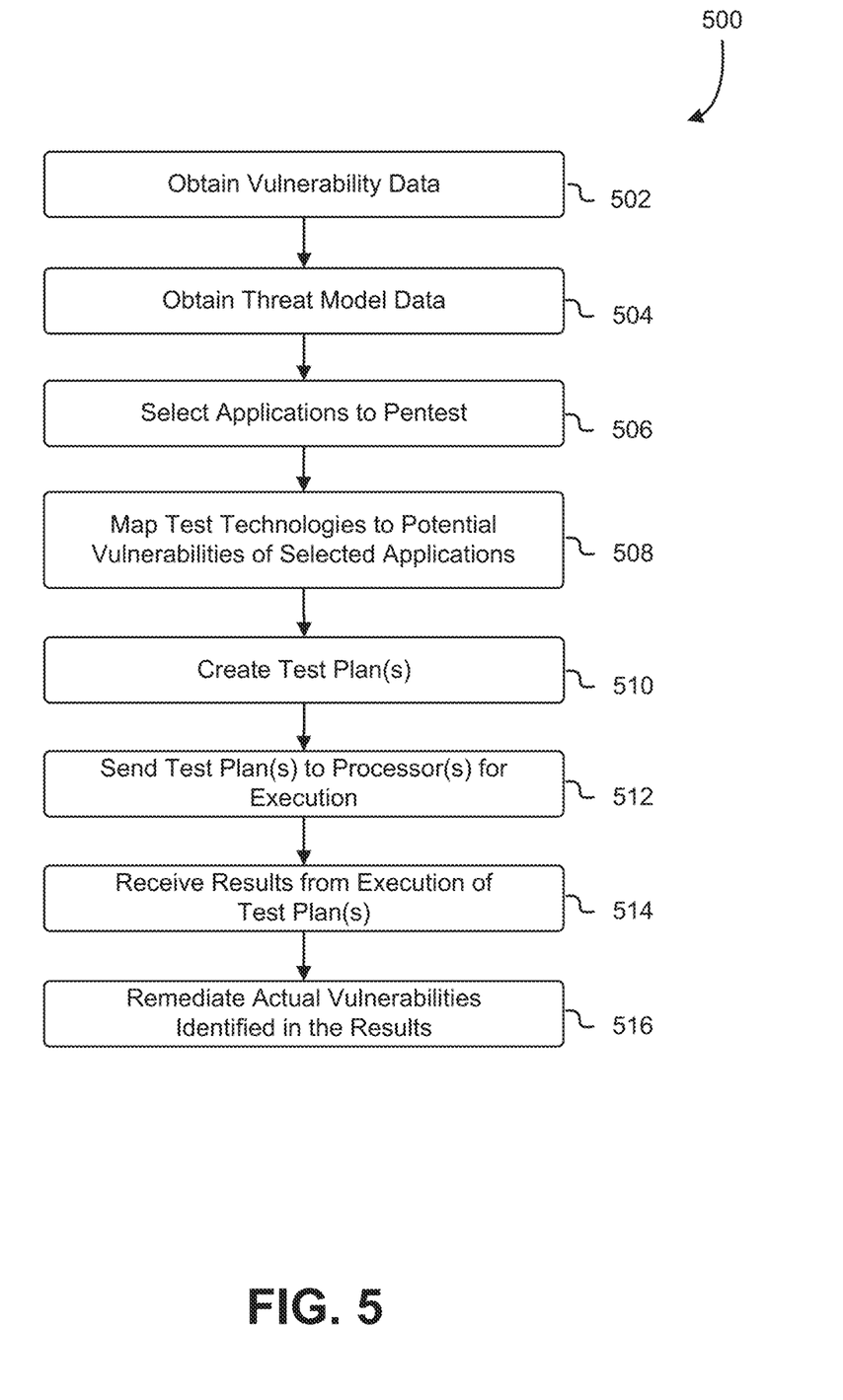
FIG. 5 is flow diagram of a method that may be performed in part by the system of FIG. 1.

FIG. 5 is flow diagram of a method 500 that may be performed in part by the system 100 (see FIG. 1). In first block 502, the command and control module 130 (see FIG. 1) obtains the vulnerability data 250 (see FIG. 2). Referring to FIG. 1, the vulnerability data 250 associates a plurality of potential vulnerabilities with the applications 104 and associates the applications 104 with a plurality of targets that are publicly accessible over a network (e.g., the Internet). Referring to FIG. 2, the reconnaissance component 210 of the command and control module 130 may obtain the vulnerability data 250 as described above. The reconnaissance component 210 may store the vulnerability data 250 in a data source, such as a file or database, or transmit the vulnerability data 250 to the model component 220 and/or the application ranking component 230.

Next, in block 504 (see FIG. 5), the command and control module 130 (see FIG. 1) obtains the threat model data 262 created for the applications 104 by the model module 120 using the threat model diagram(s) 260. The threat model data 262 associates a plurality of actors with the applications 104. The model component 220 of the command and control module 130 may obtain the threat model data 262 and store the threat model data 262 in a data source, such as a file or database, or transmit the threat model data 262 to the application ranking component 230. Together, the vulnerability data 250 and the threat model data 262 are referred to as the application data 270.

In block 506 (see FIG. 5), the command and control module 130 selects the portion 102 of the applications 104 to pentest. The application ranking component 230 of the command and control module 130 may select the portion 102 by assigning risk scores to the applications 104 using the scoring model 162, and selecting the portion 102 from the set of applications based at least in part on the risk scores. The portion 290 of the application data 270 is related to the portion 102 of the applications 104.

Referring to FIG. 3, in block 508 (see FIG. 5), the command and control module 130 obtains at least the portion 290 of the application data 270 (see FIG. 2) and maps test technologies to the potential vulnerabilities identified for the portion 102 (see FIGS. 1 and 2) of the applications 104 (see FIGS. 1 and 2) based on the data 340. The test technologies may be mapped to the potential vulnerabilities by the test procedure mapping component 310.

In block 510 (see FIG. 5), the command and control module 130 creates the test plan(s) 350. In the embodiment illustrated in FIG. 3, the test plan(s) 350 are generated by the test plan generator 320 based at least in part in the technology mapped data 342 and using the test model 164.

In block 512 (see FIG. 5), the command and control module 130 sends the test plan(s) 350 to the execution module 140 (see FIG. 1) for execution thereby. In the embodiment illustrated in FIG. 3, the test plan generator 320 stores the test plan(s) 350 in the test data source 330. The scheduler 370 converts the test plan(s) 350 into the job(s) 360 by assigning the execute time value to each of the test plan(s) 350. Referring to FIG. 4, each of the test engine(s) 410 receives (e.g., pulls) any of the job(s) 360 assigned to the test engine from the test data source 330. Each of the job(s) 360 includes a portion of the testing steps included in one of the test plan(s) 350. For each job assigned to each of the test engine(s) 410, the test engine is configured to send instructions to one or more of the processor(s) 420 that causes the processor(s) to execute the testing step(s) included in the job and return testing results to the test engine.

Referring to FIG. 5, in block 514, the command and control module 130 receives the testing results from the execution module. In the embodiment illustrated in FIG. 4, each of the test engine(s) 410 may forward any test results 390 the test engine receives to the test data source 330 (see FIG. 3) and/or the vulnerabilities database 380 (see FIG. 3). The test results 390 may identify one or more actual vulnerability. Users (e.g., the user 280) may review the test results 390 by querying the test data source 330 and/or the vulnerabilities database 380 and, optionally, viewing reports prepared based on the query results.

Referring to FIG. 5, in block 516, users (e.g., developers) may remedy any actual vulnerabilities identified in the test results 390. Then, the method 500 terminates.

As one skilled in the art will appreciate in light of this disclosure, certain embodiments may be capable of achieving certain advantages, including some or all of the following: (1) leveraging threat model diagrams to improve pentesting, (2) providing a less time consuming and labor intensive pentest process that allows applications to be released with less delay, (3) prioritizing pentesting based on risk, (4) allowing large external surfaces to be adequately pentested, and (5) applying pentesting consistently across different applications.

Figure 6:
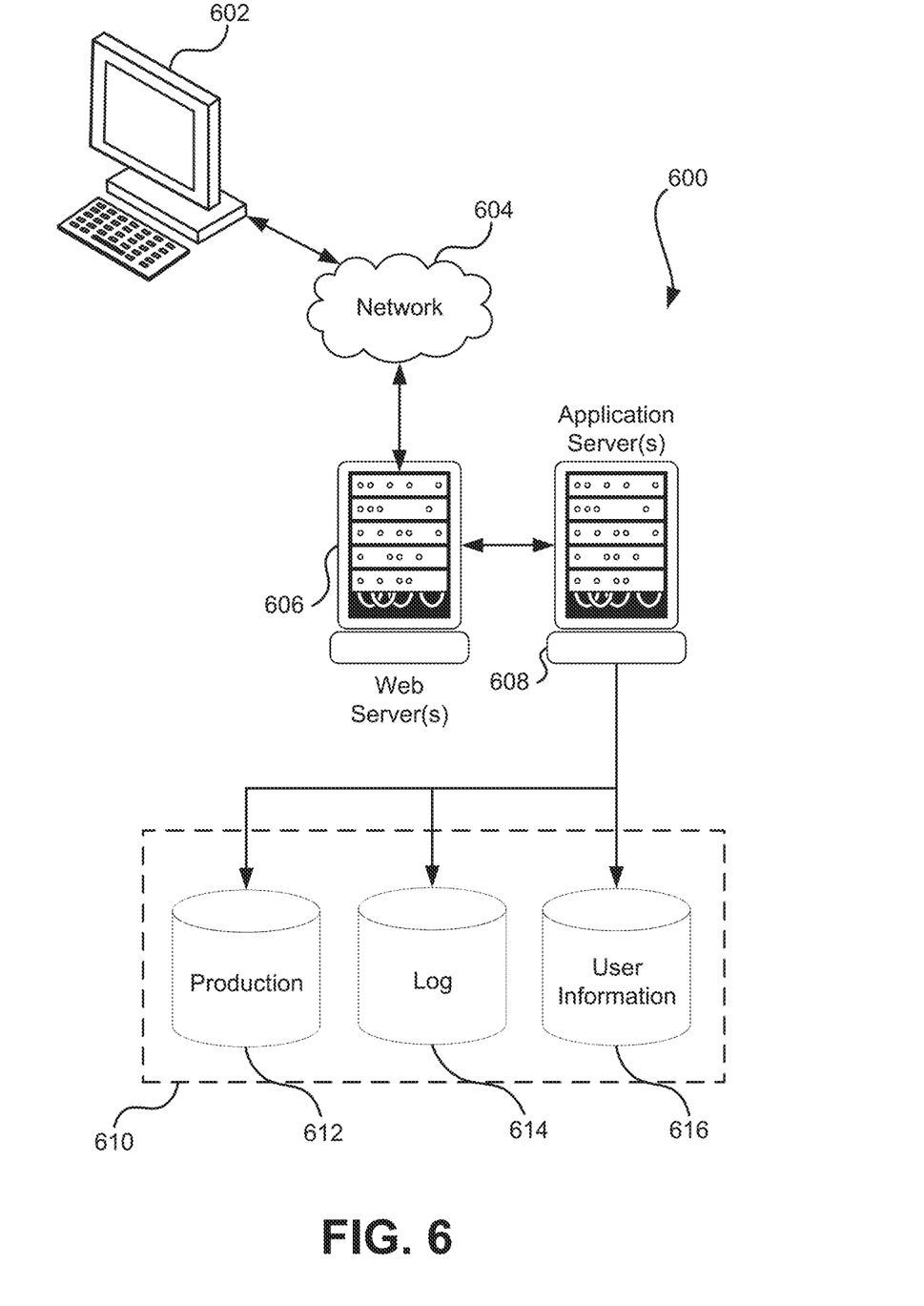
FIG. 6 illustrates a system in which various embodiments can be implemented.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes the electronic client device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes the web server 606 for receiving requests and serving content in response thereto, although for other networks an alternative device serving a similar purpose could be used as would be apparent to one of ordinary skill in the art.

In an embodiment, the illustrative system includes the at least one application server 608 and a data store 610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the electronic client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the electronic client device 602. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining vulnerability data associating a plurality of potential vulnerabilities with a plurality of applications and associating the plurality of applications with a plurality of targets that are publicly accessible over a network;
    obtaining threat model data created for the plurality of applications by a plurality of threat models, the threat model data associating a plurality of actors with the plurality of applications;
    mapping a plurality of technologies to the plurality of potential vulnerabilities based at least in part on the plurality of actors;
    creating at least one test plan based at least in part on the plurality of technologies;
    creating jobs based at least in part on the at least one test plan;
    sending the jobs to at least one processor configured to execute the jobs, which, when executed, test the plurality of applications via the plurality of targets; and
    receiving results from the at least one processor after execution of the jobs.

2. The computer-implemented method of claim 1, further comprising:
    selecting the plurality of applications before obtaining the vulnerability data and the threat model data by assigning risk scores to a set of applications, and selecting the plurality of applications from the set of applications based at least in part on the risk scores.

3. The computer-implemented method of claim 1, wherein mapping the plurality of technologies to the plurality of potential vulnerabilities comprises looking up a pair comprising a particular one of the plurality of actors and a particular one of the plurality of potential vulnerabilities associated with the particular actor in data comprising preexisting pairings of actors and vulnerabilities associated with preexisting technologies.

4. The computer-implemented method of claim 1, wherein obtaining the vulnerability data comprises:
    mapping an external surface comprising the plurality of targets associated with the plurality of applications; and
    mapping an internal surface comprising the plurality of potential vulnerabilities associated with the plurality of applications.

5. A system, comprising:
    one or more processors;
    memory that stores computer-executable instructions that are executable by the one or more processors to cause the system to:
    associate a plurality of technologies with a plurality of potential vulnerabilities based at least in part on threat model data created by a plurality of threat models for a plurality of applications, the threat model data associating a plurality of actors with the plurality of applications, the plurality of actors being capable of taking advantage of the plurality of potential vulnerabilities associated with the plurality of applications;
    use the plurality of technologies to formulate tests to be performed on the plurality of applications;
    instruct at least one processor to perform the tests on the plurality of applications; and
    receive results from the at least one processor after performance of the tests.

6. The system of claim 5, wherein the computer-executable instructions are executable by the one or more processors to cause the system to:
    select the plurality of applications before the plurality of technologies are associated with the plurality of potential vulnerabilities, the plurality of applications being selected by assigning risk scores to a set of applications, selecting, as the plurality of applications, a portion of the set of applications based at least in part on the risk scores.

7. The system of claim 6, wherein the risk scores are assigned by a machine learning model comprising a decision tree or a neural network.

8. The system of claim 5, wherein the tests are performed on a plurality of targets, and
    the tests comprises multiple chained tests performed on at least one of the plurality of targets.

9. The system of claim 5, wherein the plurality of actors comprise at least one of an entity, person, or automated process.

10. The system of claim 5, wherein causing the at least one processor to perform the tests on the plurality of applications comprises:
    creating jobs based at least in part on the tests; and
    sending the jobs to the at least one processor, the jobs instructing the at least one processor to perform the tests on the plurality of applications.

11. The system of claim 10, wherein the computer-executable instructions are executable by the one or more processors to cause the system to:
    obtain vulnerability data associating the plurality of potential vulnerabilities with the plurality of applications and associating the plurality of applications with a plurality of targets that are publicly accessible over a network, the jobs identifying one or more of the plurality of targets to be tested by the at least one processor.

12. The system of claim 11, wherein the vulnerability data is obtained by:
    mapping an external surface comprising the plurality of targets associated with the plurality of applications; and
    mapping an internal surface comprising the plurality of potential vulnerabilities associated with the plurality of applications.

13. A non-transitory computer-readable storage medium storing thereon executable instructions that, as a result of being executed by one or more processors of a computer system, cause the computer system to:

obtain threat model data associating at least one actor with an application, the at least one actor comprising an entity, a person, or an automated process capable of taking advantage of at least one potential vulnerability associated with the application;

associate at least one technology with the at least one potential vulnerability based at least in part on the at least one actor;

formulate a test to be performed on the application based at least in part on the at least one technology;

instruct a processor to perform the test on the application; and receive results from the processor after performance of the test.

14. The non-transitory computer-readable storage medium of claim 13, wherein the instructions further comprise instructions that, as a result of being executed by the one or more processors, cause the computer system to obtain vulnerability data associating the at least one potential vulnerability with the application.

15. The non-transitory computer-readable storage medium of claim 14, wherein the vulnerability data associates the application with one or more targets that are publicly accessible over a network, and instructing the processor to perform the test comprises instructing the processor to perform multiple chained tests on a particular target of the one or more targets.

16. The non-transitory computer-readable storage medium of claim 14, wherein the vulnerability data associates the application with one or more targets that are publicly accessible over a network, and obtaining the vulnerability data comprises:

mapping an external surface comprising the one or more targets associated with the application; and mapping an internal surface comprising the at least one potential vulnerability associated with the application.

17. The non-transitory computer-readable storage medium of claim 13, storing data associating a plurality of technologies with a plurality of known actors, wherein the at least one technology is associated with the at least one potential vulnerability by looking up the at least one actor and the at least one potential vulnerability in the data.

18. The non-transitory computer-readable storage medium of claim 13, wherein the instructions further comprise instructions that, as a result of being executed by the one or more processors, cause the computer system to display a graphical user interface configured to display recommendations for remediating at least one actual vulnerability identified in the results to one or more users.

19. The non-transitory computer-readable storage medium of claim 13, wherein the instructions further comprise instructions that, as a result of being executed by the one or more processors, cause the computer system to select the application by assigning risk scores to a plurality of applications, and selecting the application from the plurality of applications based at least in part on the risk scores.

20. The non-transitory computer-readable storage medium of claim 19, wherein the risk scores are assigned by a machine learning model comprising a decision tree or a neural network.

* * * * *